March 12, 1940.   F. A. LAYTHORPE   2,193,178
ROTARY INTERNAL COMBUSTION ENGINE
Filed Feb. 14, 1938   3 Sheets-Sheet 2

INVENTOR
F. A. LAYTHORPE DEC'D.
By A. E. LAYTHORPE
Adm'n'x'

March 12, 1940. F. A. LAYTHORPE 2,193,178
ROTARY INTERNAL COMBUSTION ENGINE
Filed Feb. 14, 1938 3 Sheets-Sheet 3

INVENTOR.
F. A. LAYTHORPE DEC'D
By A. E. LAYTHORPE
Adm'n'x.
By
Atty

Patented Mar. 12, 1940

2,193,178

UNITED STATES PATENT OFFICE 2,193,178

ROTARY INTERNAL COMBUSTION ENGINE

Frank Albert Laythorpe, deceased, late of Romford, England, by Annie Ellen Laythorpe, administratrix, Romford, England, assignor to L. V. B. Compressors Limited, Romford, England Application February 14, 1938, Serial No. 190,509
In Great Britain March 2, 1937

1 Claim. (Cl. 123—8)

This invention relates to a rotary internal combustion engine and has for its object to provide an efficient power unit of simple construction.

Broadly the invention provides a rotary engine comprising a charge-compressing unit and a power unit, both units incorporating rotors mounted eccentrically within chambers to provide crescent-shaped working compartments, within which compartments charge-compressing and combustion cells are formed between adjacent vanes slidably mounted on the rotors.

The engine components are so constructed and arranged that the transference of the compressed charge is effected from a compression unit cell to a power unit cell when the latter is substantially devoid of pressure and, in any event, is at a lower pressure than the compression unit cell.

The power unit rotor may be provided with peripheral combustion pockets between the rotor vanes, the capacity of which may be varied so as to alter the compression ratio of the engine.

An embodiment of the invention is illustrated in the accompanying drawings, wherein:

Figure 1 is a transverse section through the engine.

Figure 2 is a side view looking in the direction of arrow II—Figure 1—with the casing cover and stub shaft 5 of the power unit removed and the rotor shown partially in section.

Figure 3:
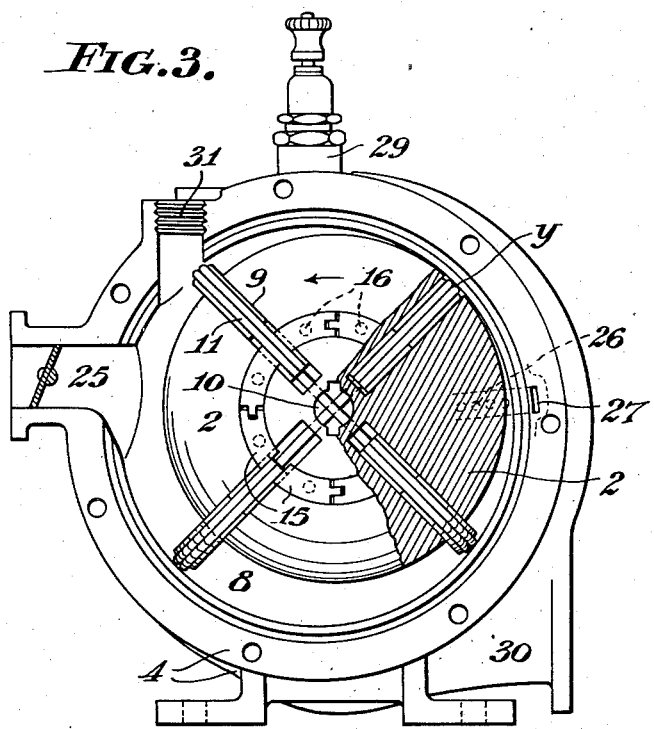
Figure 3 is a side view looking in the direction of arrow III—Figure 1—with the casing cover and stub shaft 5' of the compression unit removed and parts shown broken away.
Figure 4:
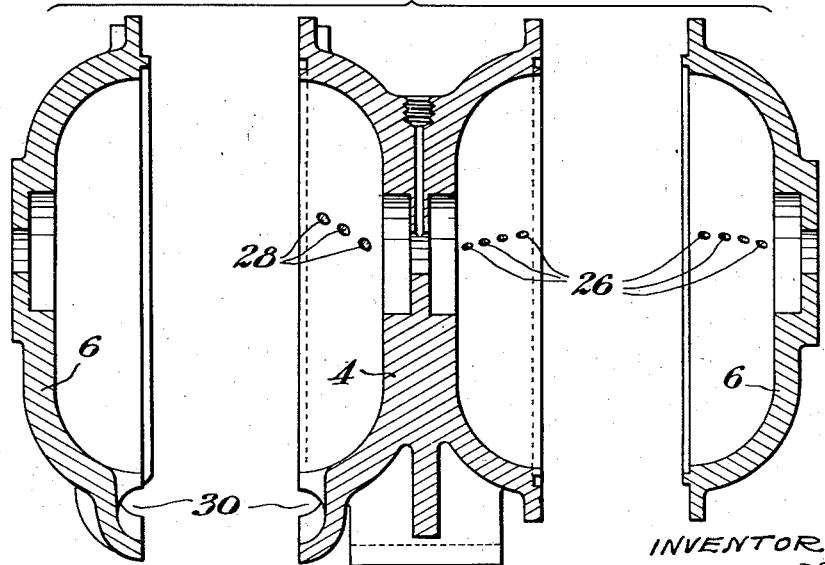
Figure 4 is a transverse section through the casing, showing the covers separated therefrom.
Figure 5:
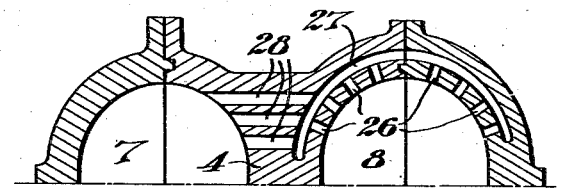
Figure 5 is a fragmentary sectional view through the transfer ducts and ports.
Figure 6:
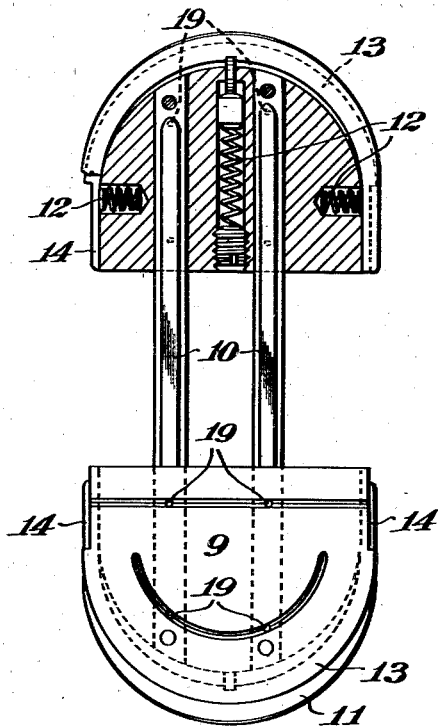
Figure 6 is a front elevation of one of the vane units showing one of the vanes thereof in section.
Figure 7:
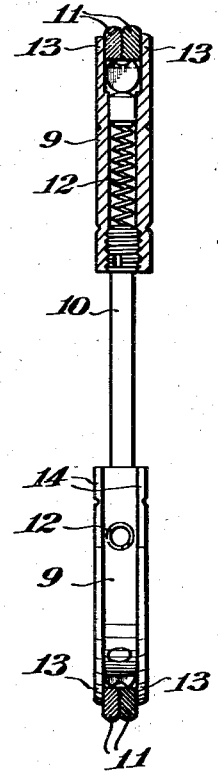
Figure 7 is a side elevation of one of the vane units showing one of the vanes thereof in section.

In the construction illustrated, a power rotor 1 and a compression rotor 2 are keyed to a common shaft 3 journalled in the partition of a casing 4 and supported also by aligned shafts 5 and 5' journalled in the covers 6 thereof. The rotors 1 and 2 are mounted eccentrically within the casing so as to provide crescent-shaped working compartments, but whereas the rotors 1 and 2 are in alignment, their respective chambers 7, 8 are in disalignment, so that the point $x$ where the periphery of the compression rotor 2 contacts with its chamber 8 is about 45° in advance of the point $v$ where the periphery of the power unit 1 contacts with its chamber 7. Each rotor 1, 2 carries an even number of sliding vanes 9, rigidly coupled in opposite pairs by pairs of tie rods 10, thereby preventing outward movement of each vane 9 independently under the action of centrifugal force. In this way excessive friction of the vanes 9 against the chamber wall at high speeds is eliminated. The vanes 9 carry U-shaped sealing strips 11 which are pressed by springs 12 into contact with the chamber walls. The strips 11 are accommodated between flanges 13, portions of which (indicated at 14) are cut away to permit curved sealing strips 15 to extend over the flanges 13 and make end contact with the vane sealing strips 11. The curved strips 15 (of which there are preferably two, interlocked as shown, between adjacent vanes 9) are accommodated in grooves 16 in the side faces of the rotors 1, 2 and are forced by springs 17 into intimate contact with the walls of the chambers 7, 8 and the covers 6, to prevent leakage of fluid toward the shafts 3, 5 and 5'. The tie rods 10 are flattened to allow lubricating oil to pass into the rod sockets 18 and out through holes 19 to the outer faces of the vanes 9. The oil holes 19 are uncovered only when the vane 9 is at its furthest point of projection from the rotor, at which point the cell formed between adjacent vanes is at its lowest pressure or compression. The lubricant is fed, preferably under pressure, through the passage 20 and the bore 21 of shaft 3 to the bores 22 of the rotors 1, 2 through which latter the crossing tie-rods 10 of the two pairs of vanes 9 pass.

Figure 8:
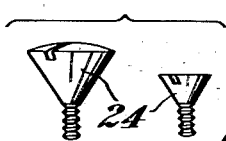
Figure 8 shows two forms of plug for varying the capacity of the rotor pockets.

Conical "combustion" pockets 23 are provided in the periphery of the power rotor 1, in the base of which conical plugs 24 of different sizes (see Figure 8) may be screwed to vary the capacity of the pockets 23 and thus alter the compression ratio of the engine.

The combustible mixture of fuel and air enters the compression unit through a throttle-regulated suction inlet 25 and is compressed in the cells formed between adjacent blades 9 of the compression rotor 2, by reason of the diminishing size of the cell as it approaches the contact point $v$. The compressed mixture discharges through ports 26 into a transfer duct 27, and leaves this duct 27 through inlet ports 28 to enter a cell in the power unit which is at a lower pressure than that from whence the compressed charge has issued. The pockets 23 convey the highly compressed mixture over the dead centre or con- March 12, 1940.  W. P. MacMICKING  2,193,179
DIRECTIONAL SIGNAL
Filed May 20, 1938  2 Sheets-Sheet 1
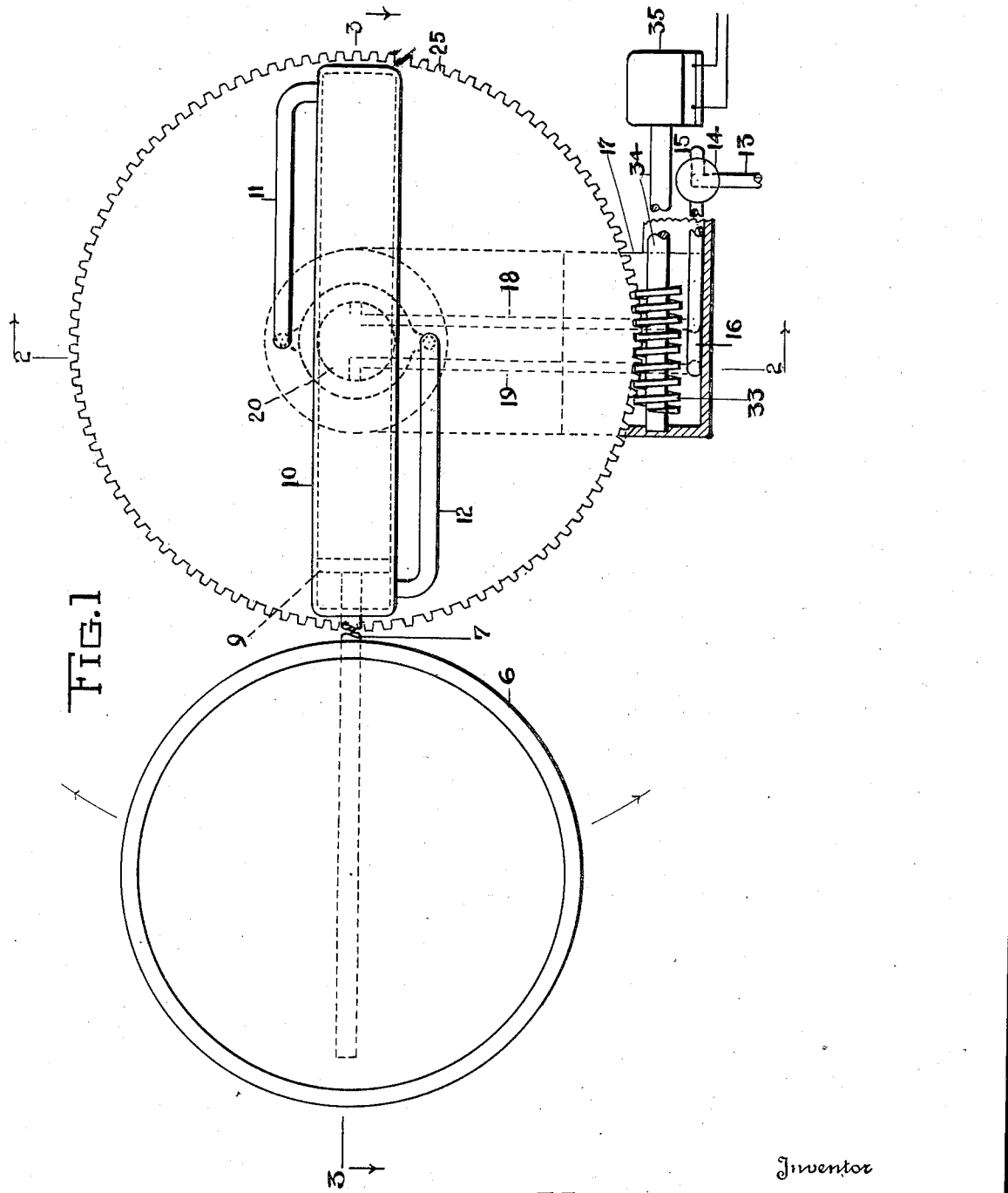
Inventor
WILLIAM P. MacMICKING
By Edward M. Fisher
Attorney